T861041

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED APRIL 22, 1969

861 O.G. 1020

775,578

MODIFIED POLYETHYLENE

Marion O. Brunson, % Tennessee Eastman Co., P.O. Box 511, Kingsport, Tenn. 37662

Continuation of application Ser. No. 603,108, Dec. 20, 1966. This application Oct. 31, 1968. Published Apr. 22, 1969

Class 260—29.6

No Drawing. 16 Pages Specification

A process for finishing textile fabrics which comprises contacting a textile fabric with an aqueous dispersion of an emulsifiable low molecular weight modified polyethylene composition, having a saponification number of at least 6, a melt viscosity of about .1 to .5. The modified polyethylene composition is obtained by reacting a low molecular weight crystallizable polyethylene having an inherent viscosity of about .1 to about .5 with unsaturated polycarboxylic acids, unsaturated polycarboxylic acid anhydrides or unsaturated polycarboxylic acid esters at a temperature of 200 to 400° C. The aqueous dispersion contains about 20 to about 45% by weight solids. These dispersions are diluted to a solution containing 2 weight percent modified polyethylene and about 25 weight percent of a permanent press thermosetting resin is added to this solution. This solution is then padded onto a textile fabric to obtain a 70 percent wet pick up and then air dried. The textile fabric can then be hot pressed to impart a permanent press to garments prepared therefrom.